Patented Dec. 8, 1936

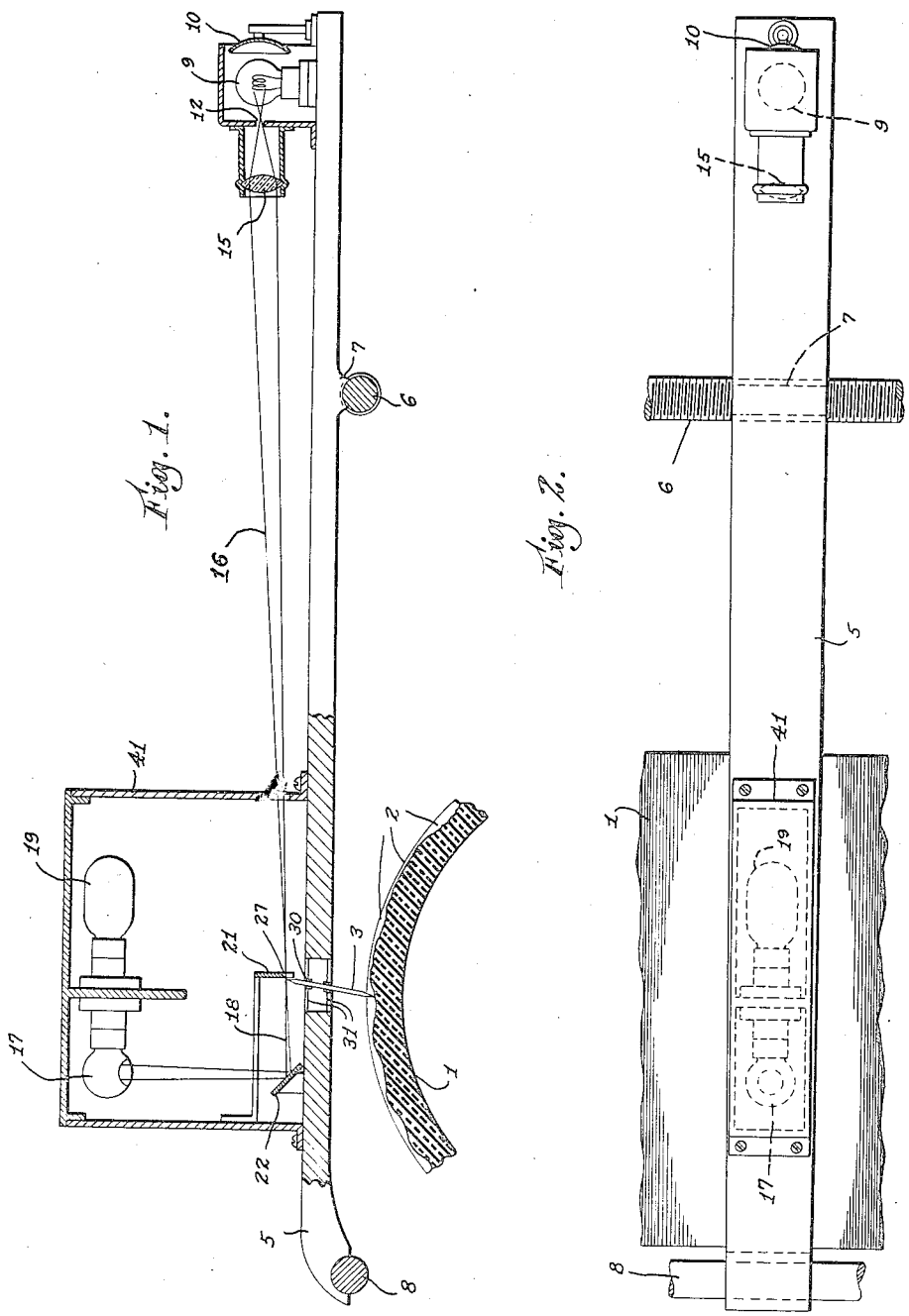

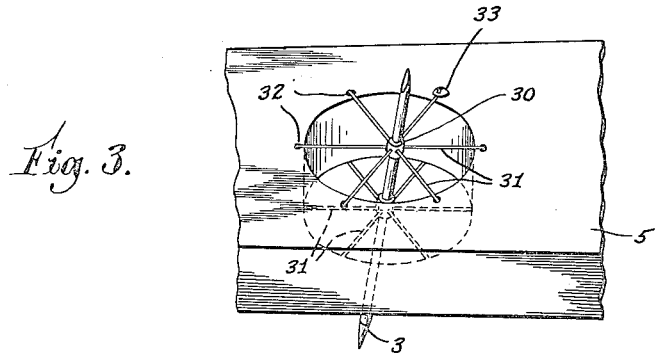
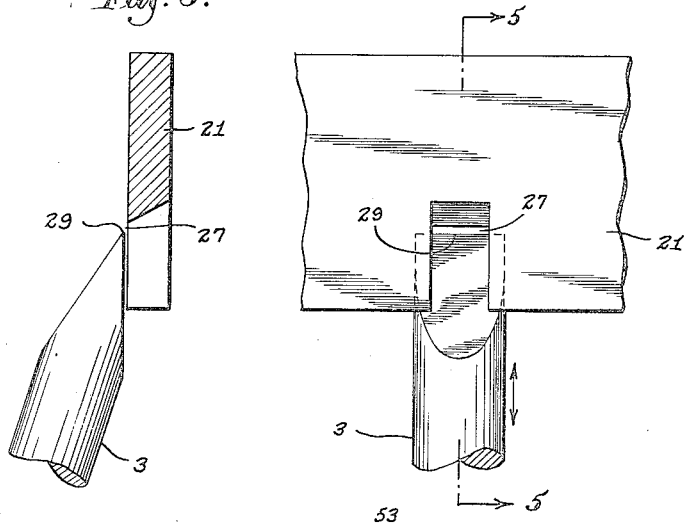
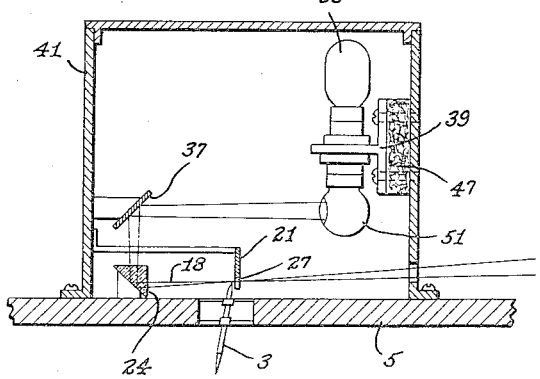

2,063,225

UNITED STATES PATENT OFFICE 2,063,225

PHONOGRAPH PICK-UP

Edward Lindley Bowles, Wellesley Farms, Mass.

Application October 7, 1932, Serial No. 636,706

8 Claims. (Cl. 179—100.41)

The present invention relates to electromechanical conversion devices, and more particularly to pick-ups for reproducing sound recordings on wax or similar phonographic discs, and especially records of the type known as "hill and dale".

An object of the invention is to provide a device of the above-described character employing light rays as the indirect means for translating the groove-undulations into sound. An intermediately disposed amplifier may be employed.

With this end in view, a feature of the invention resides in the use of a variable aperture, controlled by the stylus so as to vary the amount of transmitted light falling on a photocell, thus to translate the modulations of the light beam into modulations of an electric current. These modulations are facsimiles of the mechanical vibrations of the stylus, which vibrations are, in their turn, caused by the sound track in the record.

Other and further objects will be explained hereinafter and will be particularly pointed out in the appended claims.

The invention will be explained in connection with the accompanying drawings, in which Fig. 1 is a diagrammatic longitudinal section, with parts exaggerated in size, for clearness, of apparatus embodying the present invention; Fig. 2 is a corresponding plan of the same; Fig. 3 is a fragmentary enlarged perspective illustrating a preferred suspension for the stylus; Fig. 4 is an enlarged, fragmentary detail; Fig. 5 is a section taken upon the line 5—5 of Fig. 4, looking in the direction of the arrows; and Fig. 6 is a view similar to Fig. 1 of a modification.

A phonograph record 1, with "hill and dale" recorded undulations 2, is shown greatly enlarged in Fig. 1. A stylus 3, in movable contact with these undulations, is mounted upon a movable framework carriage 5 that is caused to travel by a feed screw 6 and a nut 7 in a manner well known, the carriage 5 being guided in its travel by a track rod 8. The light from a light source 9, reflected by a reflector 10, passes, in the form of a beam 16, to a slit 12, and is converged by a lens 15 to produce an image of the slit 12 on a window or aperture 27 in a member 21. The light beam 18 continues on through the aperture 27 to a mirror 22, by which it is reflected to a photocell 17, connected in circuit with an amplifier tube 19, in any well known manner. The mirror 22 may be replaced by a prism 24, as illustrated in Fig. 6.

The light source 9, the photocell 17 and the other apparatus described are all, like the stylus 3, supported by the carriage 5. The photoelectric cell 17 and the amplifier tube 19 may both be contained within a metal box 41, so as to be shielded from external disturbances in the form of either electric or light manifestations. There need not, therefore, in view of the manner of travel of the carriage 5, be any average component of longitudinal force on the stylus to affect the translation of the stylus, which will thus be caused to follow the grooves 2. This fact makes it possible to design the stylus and its supporting structure for one purpose only—namely, that of vibrating as a whole in accordance with the record track.

The stylus 3 may be held in the framework 5 by means of tension fibers or wires 31, as illustrated more particularly in Fig. 3, in such a manner that it may move vertically up and down in accordance with the up-and-down movement of the "hill and dale" sound track on the wax record 1.

The suspension fibers 31 may be cemented at one of their ends to a small collar 30 and at their other extremity 32 to the carriage member 5. Before cementing the ends 32, the fibers may all be put under equal tension by means of equal weights. In place of cementing, or in combination with the cementing, the extremities 32 of the fibers may be secured by screws 33. By means of this suspension arrangement, a very light stylus may be used and it may be supported in such a manner as to have no noticeable effect of its own on the quality of the reproduced sound recorded on the "record".

The stylus 3 may be provided with a knife edge 29, as shown more particularly in Figs. 4 and 5, disposed adjacent to the window element 21, so as to produce the small, variable aperture 27 before mentioned, and to which the light from the source 9 must pass in reaching the photocell 17.

As the stylus moves up and down, therefore, the aperture 27 is caused to vary in area, thus varying, in proportion, the quantity of light reaching the photoelectric cell 17.

In operation, the carriage 5, with its associated equipment, follows the record groove 2 by means of the feed screw 6 and the nut 7. The stylus 3 is caused to move up and down, in accordance with the recorded undulations 2 on the record 1. This movement of the stylus modulates the light beam 16 reaching the photoelectric cell 17. The photoelectric cell and its associated amplifier 19 yield an electrical output to be transmitted to an amplifier unit external to the carriage. The output from this amplifier tube 19 may be transmitted to any suitable amplifier equipment in a manner well known to those skilled in the art.

The photocell may be arranged as shown in Fig. 6 at 51, in which case an additional mirror 37 may be utilized, further to reflect the beam 18. In this way, the photocell and the amplifier tube 53 may be moved as far away from the stylus 3 as desired. According to this modification, the base 39 supporting these tubes is shown acoustically insulated from the supporting wall of container 41 by means of suitable material 47. This material may, for example, be sponge rubber or felt. This insulation precludes the possibility of mechanical vibration of the tube elements, with consequent reproduction of the effect. It also prevents mechanical resonance effects of the tube elements with consequent electrical reproduction.

The present invention provides an almost inertialess stylus, which will not only reproduce the recordings on the wax with great fidelity, but will also cause a very, very small wear of the material on which the record is made, thus adding to the life of the record. The lightness of the moving parts of the translating system makes it possible to increase greatly the frequency range over which wax recording may be reproduced. It is, of course, to be understood that the term "wax recording" is intended to embrace all materials, metal or otherwise, upon which sound grooves can be recorded.

Further modifications and changes will occur to persons skilled in the art and all such are considered to fall within the spirit and scope of the invention as defined in the appended claims.

What is claimed is:

1. Phonographic apparatus comprising means for directing energy rays along a predetermined path, a stylus a portion of which is adapted to be disposed in contact with the sound track of a record of the "hill-and-dale" type, and means for mounting the stylus with said portion in contact with said sound track with another portion of the stylus in said path and so as to cause the stylus to be vibrated substantially axially of itself freely in response to pressure exerted on said first-named portion of the stylus by said sound track, the stylus being unloaded and relatively very light and almost inertialess in order that its vibrations shall follow the record faithfully to cause the recordings on the record to be reproduced with great fidelity and to prevent the stylus from having any noticeable effect of its own on the quality of the reproduced sound recorded on the record.

2. Phonographic apparatus comprising a member having a window, means for producing energy rays and directing them along a predetermined path toward the window, a stylus a portion of which is adapted to be disposed in contact with the sound track of a record, and means for mounting the stylus with said portion in contact with said sound track and with another portion of the stylus adjacent to the window and so as to cause the stylus to be vibrated freely in response to pressure exerted on said first-named portion of the stylus by said sound track, whereby an aperture is formed by said portion of the stylus adjacent to the window, the stylus being unloaded and relatively very light and almost inertialess in order that its vibrations shall follow the record faithfully to cause the recordings on the record to be reproduced with great fidelity and to prevent the stylus from having any noticeable effect of its own on the quality of the reproduced sound recorded on the record.

3. Phonographic apparatus comprising a member having a window, means for producing energy rays and directing them along a predetermined path toward the window, a stylus a portion of which is adapted to be disposed in contact with the sound track of a record of the "hill-and-dale" type, and means for mounting the stylus with said portion in contact with said sound track and with another portion of the stylus adjacent to the window and so as to cause the stylus to be vibrated substantially axially of itself freely in response to pressure exerted on said first-named portion of the stylus by said sound track, whereby an aperture is formed by said portion of the stylus adjacent to the window, the stylus being unloaded and relatively very light and almost inertialess in order that its vibrations shall follow the record faithfully to cause the recordings on the record to be reproduced with great fidelity and to prevent the stylus from having any noticeable effect of its own on the quality of the reproduced sound recorded on the record.

4. Phonographic apparatus comprising a frame having an opening, a stylus disposed in the opening, and a plurality of flexible fibres for supporting the stylus in the opening, the fibres being secured at one end to the frame and the other end to the stylus the stylus being supported solely by the fibres and being otherwise free to move, the fibres flexing freely during the movement of the stylus.

5. Phonographic apparatus comprising a carriage having an opening, a stylus disposed in the opening, a plurality of flexible fibres for supporting the stylus in the opening, the fibres being secured at one end to the frame and the other end to the stylus, the stylus being supported solely by the fibres and being otherwise free to move, the fibres flexing freely during the movement of the stylus, and means for actuating the carriage.

6. Phonographic apparatus comprising means for producing energy rays, a stylus disposed in the path of the rays and adapted to co-operate with a record of the "hill and dale" type, and means actuating the stylus substantially axially of itself in the said path relatively to a record to cause the stylus to move in accordance with the record.

7. Phonographic apparatus comprising a carriage, means for moving the carriage relatively to a record of the 'hill and dale" type, means supported by the carriage for producing energy rays, a stylus supported by the carriage in the path of the rays, and means for actuating the stylus substantially axially of itself.

8. Phonographic apparatus comprising a member having a window, means for producing energy rays and causing them to travel toward the window, a stylus disposed in the path of travel of the rays, and having a portion adacent to the window, the stylus being adapted to co-operate with a record of the "hill and dale" type, whereby an aperture is formed by the said portion near the window, and means for actuating the stylus substantially axially of itself relatively to a record to cause the stylus to vary the size of the aperture.

EDWARD L. BOWLES.